US008959700B2

(12) United States Patent
Yoshimoto et al.

(10) Patent No.: US 8,959,700 B2
(45) Date of Patent: Feb. 24, 2015

(54) WIPER BLADE (75) Inventors: Takao Yoshimoto, Toyohashi (JP); Masahiro Oota, Hamamatsu (JP); Naoki Torii, Toyohashi (JP); Masahiro Kitamura, Kosai (JP)

(73) Assignee: Asmo Co., Ltd., Kosai-shi (JP)

( * ) Notice: Subject to any disclaimer, the term of this patent is extended or adjusted under 35 U.S.C. 154(b) by 0 days.

(21) Appl. No.: 13/611,805

(22) Filed: Sep. 12, 2012

(65) Prior Publication Data

US 2013/0067676 A1 Mar. 21, 2013

(30) Foreign Application Priority Data

| Sep. 15, 2011 | (JP) | 2011-202127 |
| Sep. 26, 2011 | (JP) | 2011-209896 |
| Sep. 26, 2011 | (JP) | 2011-209897 |
| Sep. 28, 2011 | (JP) | 2011-212713 |
| Jul. 30, 2012 | (JP) | 2012-168528 |

(51) Int. Cl.
*B60S 1/38* (2006.01)

(52) U.S. Cl.
CPC ............. *B60S 1/3889* (2013.01); *B60S 1/3881* (2013.01)
USPC ................ 15/250.201; 15/250.32; 15/250.43; 15/250.451

(58) Field of Classification Search
CPC ......... B60S 1/40; B60S 1/3881; B60S 1/3889
USPC ........... 15/250.201, 250.32, 250.43, 250.451, 15/250.44, 250.454, 250.48
See application file for complete search history.

(56) References Cited

U.S. PATENT DOCUMENTS

| 6,634,055 | B1 | 10/2003 | De Block | |
| 7,370,385 | B2 * | 5/2008 | Chiang | 15/250.43 |
| 7,647,669 | B2 * | 1/2010 | Chen | 15/250.46 |
| 7,832,047 | B2 * | 11/2010 | Herinckx et al. | 15/250.43 |
| 7,996,953 | B2 * | 8/2011 | Braun et al. | 15/250.43 |
| 8,307,494 | B2 * | 11/2012 | Boland | 15/250.43 |
| 8,341,801 | B2 * | 1/2013 | Coos | 15/250.43 |
| 8,402,593 | B2 * | 3/2013 | Boland | 15/250.201 |
| 8,402,595 | B2 * | 3/2013 | Boland | 15/250.43 |
| 8,495,787 | B2 * | 7/2013 | Garrastacho et al. | 15/250.201 |
| 8,544,139 | B2 * | 10/2013 | Chien | 15/250.44 |

(Continued)

FOREIGN PATENT DOCUMENTS

| FR | 2922502 A1 * | 4/2009 | B60S 1/38 |
| JP | 2002-533261 | 10/2002 | |

(Continued)

*Primary Examiner* — Monica Carter
*Assistant Examiner* — Michael Jennings
(74) *Attorney, Agent, or Firm* — Christensen Fonder PA (57) ABSTRACT A wiper blade includes a wiper strip having an elongated retained portion, a backing, and a case, which retains therein the retained portion and the backing. The cap is attached to at least one of the ends in the longitudinal direction of the backing or to at least one of the ends in the longitudinal direction of the case. The interior space of the cap communicates with the interior space of the case. The cap has a rubber insertion hole that opens to the outside of the cap. The retained portion can enter the interior of the cap via the rubber insertion hole.

10 Claims, 6 Drawing Sheets

(56) References Cited

U.S. PATENT DOCUMENTS

| | | | |
|---|---|---|---|
| 2006/0107485 A1* | 5/2006 | Kim | 15/250.201 |
| 2006/0156529 A1 | 7/2006 | Thomar et al. | |
| 2007/0011840 A1* | 1/2007 | Gilli | 15/250.352 |
| 2007/0192983 A1* | 8/2007 | Chen | 15/250.001 |
| 2009/0013492 A1* | 1/2009 | Henin | 15/250.452 |
| 2009/0056049 A1 | 3/2009 | Jarasson et al. | |
| 2009/0064440 A1* | 3/2009 | Boland | 15/250.48 |
| 2009/0172910 A1* | 7/2009 | De Block et al. | 15/250.361 |
| 2010/0242204 A1* | 9/2010 | Chien | 15/250.201 |
| 2010/0319154 A1* | 12/2010 | Bousset | 15/250.48 |

FOREIGN PATENT DOCUMENTS

| | | |
|---|---|---|
| JP | 2006-500273 | 1/2006 |
| JP | 2006-513928 | 4/2006 |
| JP | 2007-531663 | 11/2007 |
| JP | 4791486 | 7/2008 |
| WO | WO 00/38964 | 7/2000 |
| WO | WO 2004/028875 | 4/2004 |
| WO | WO 2004/076252 | 9/2004 |
| WO | WO 2005/108176 | 11/2005 |
| WO | WO 2005/118363 | 12/2005 |
| WO | WO 2006/079591 | 8/2006 |

\* cited by examiner

WIPER BLADE

BACKGROUND OF THE INVENTION

The present invention relates to a wiper blade having a backing that imparts rigidity and resilience to a wiper strip.

Conventionally, wiper blades have been known that wipe a surface to be wiped such as the windshield of a vehicle. For example, Japanese National Phase Laid-Open Patent Publication No. 2006-513928 discloses a wiper blade that has a wiper strip attached to a case without using a lever assembly formed by coupling a number of levers in a whiffletree-like manner. A leaf spring-like backing is retained in the case to impart rigidity and resilience to the wiper strip. This reduces the height of the wiper blade. In the wiper blade, a cap is attached to either end in the longitudinal direction of the backing. The caps are used for determining the position of the backing in the longitudinal direction with respect to the case. The caps prevent the wiper strip and the backing from escaping the case from the ends in the longitudinal direction of the case, that is, the caps prevent the case from separating from the wiper strip and the backing.

In the wiper blade disclosed in Japanese National Phase Laid-Open Patent Publication No. 2006-513928, when replacing an old wiper strip that is worn and degraded with a new wiper strip, the two caps are removed from the backing before the wiper strip can be removed from the case. Since the caps are tiny parts, the caps may be lost when attaching or removing a wiper strip to or from the case.

Accordingly, it is an objective of the present invention to provide a wiper blade that is capable of preventing caps from being lost when attaching or removing a wiper strip to or from a case.

To achieve the foregoing objective and in accordance with one aspect of the present invention, a wiper is provided that includes an elongated wiper strip, a backing, a case, and a cap. The elongated wiper strip has an elongated retained portion and a wiping portion, which extends parallel with the retained portion, is adapted for wiping a surface to be wiped. The backing is provided along the length of the wiper strip and imparts rigidity and resilience to the wiper strip. The case is provided along the length of the wiper strip and retains therein the retained portion and the backing. The cap is attached to at least one of the ends in the longitudinal direction of the backing or to at least one of the ends in the longitudinal direction of the case. The cap accommodates a corresponding end of the wiper strip. With the cap attached to the backing or to the case, the interior space of the cap communicates with the interior space of the case. The cap has a rubber insertion hole that opens to the outside of the cap, and the retained portion can enter the interior of the cap via the rubber insertion hole.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
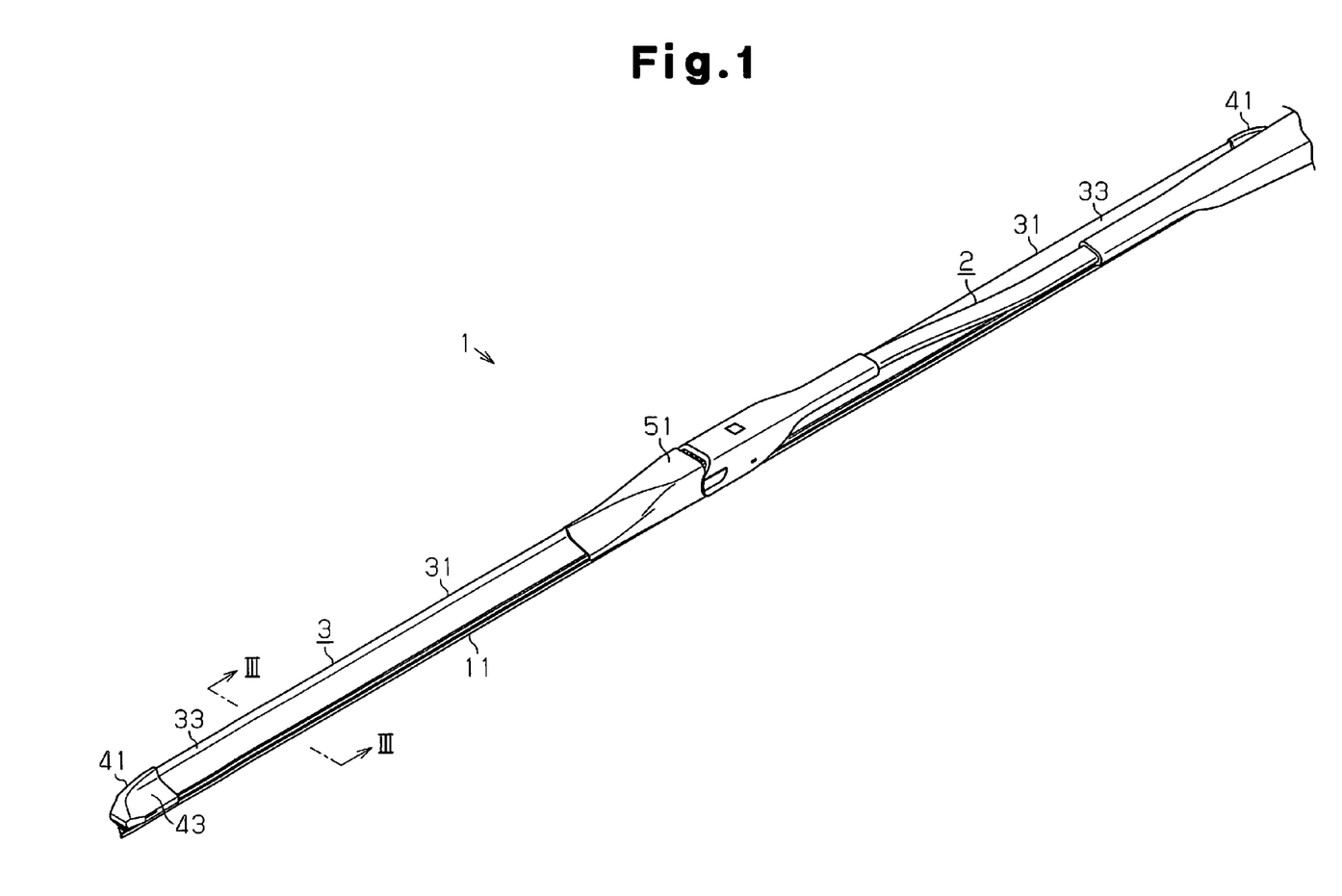
FIG. 1 is a perspective view illustrating a vehicle wiper according to one embodiment of the present invention.

A vehicle wiper 1 shown in FIG. 1 is adapted for wiping, for example, rain droplets off a surface to be wiped, which is, for example, the outer surface of vehicle windshield. The vehicle wiper 1 is formed of a substantially rod-like wiper arm 2 and a wiper blade 3, which is coupled to the distal end of the wiper arm 2. A pivot shaft (not shown) is fixed to the proximal end of the wiper arm 2. The pivot shaft is rotated by drive force of a wiper motor (not shown) within a predetermined angle, and the wiper arm 2 is swung to-and-fro in accordance with the rotation of the pivot shaft.

Figure 2:
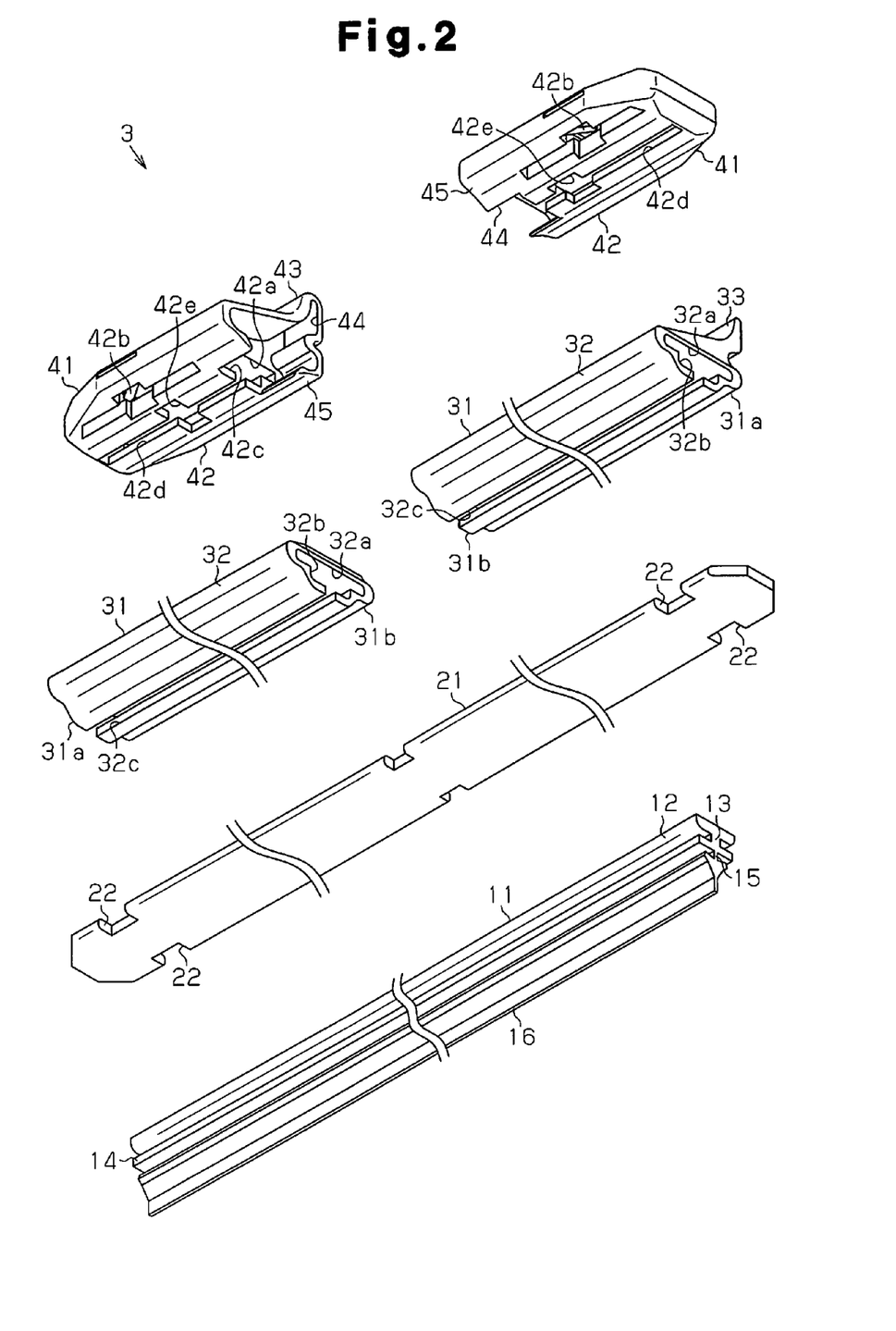
FIG. 2 is an exploded perspective view of the wiper blade shown in FIG. 1, from which a coupling device is omitted.

As shown in FIG. 2, the wiper blade 3 includes an elongated wiper strip 11, a backing 21, which is provided along the length of the wiper strip 11, a pair of cases 31, which is provided along the length of the wiper strip 11, and two caps 41, which are attached to both ends in the longitudinal direction of the backing 21.

Figure 3:
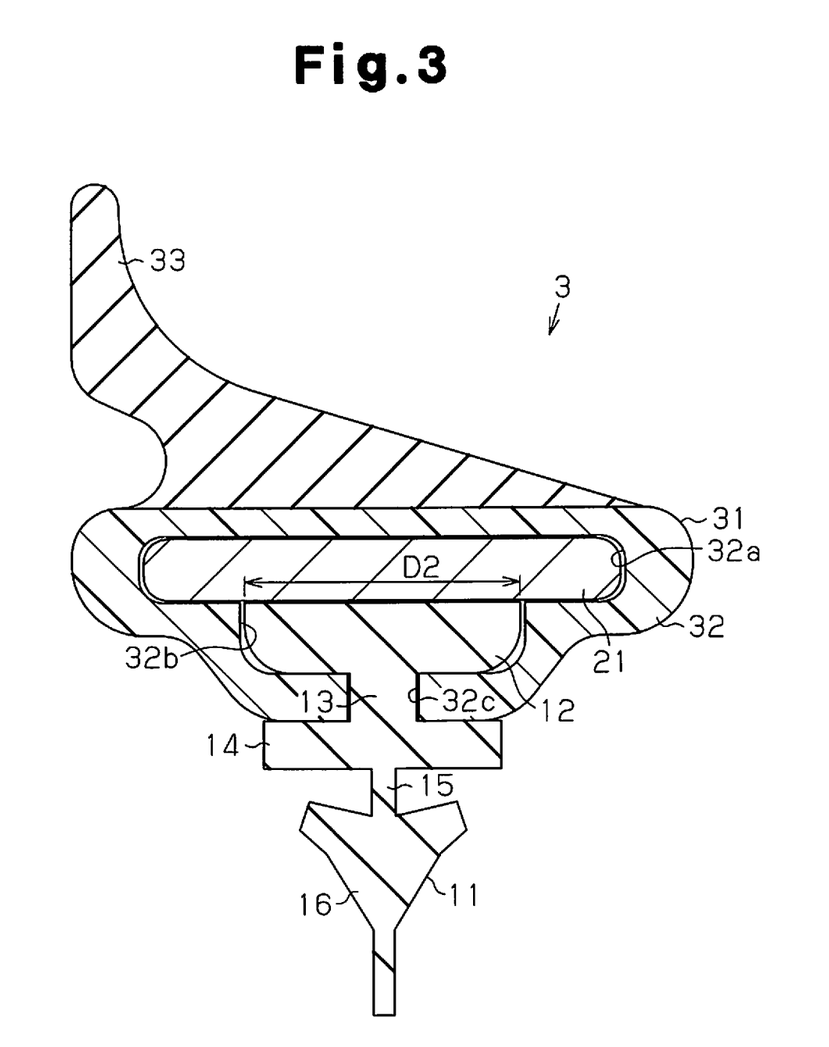
FIG. 3 is a cross-sectional view taken along line III-III of FIG. 1.

The wiper strip 11 shown in FIGS. 2 and 3 is made of an elastic rubber material. The wiper strip 11 has in its upper part an elongated and belt-like retained portion 12. A constriction 13 is formed at a center of the retained portion 12 in the width direction (left-right direction as viewed in FIG. 3). The constriction 13 protrudes in the thickness direction of the retained portion 12 (vertical direction as viewed in FIG. 3) and is integrally formed with the retained portion 12. The constriction 13 extends in the longitudinal direction of the retained portion 12 from a first end to a second end of the retained portion 12. The width of the constriction 13 is smaller than that of the retained portion 12. An elongated belt-like shoulder portion 14 is integrally formed with the lower end of the constriction 13 (the end opposite to the retained portion 12). The width of the shoulder portion 14 is substantially equal to the retained portion 12. A neck 15 is formed at a center of the shoulder portion 14 in the width direction. The neck 15 protrudes in the thickness direction of the shoulder portion 14 and is integrally formed with the shoulder portion 14. The neck 15 extends in the longitudinal direction of the shoulder portion 14 from a first end to a second end of the shoulder portion 14. The width of the neck 15 is smaller than that of the constriction 13. A wiping portion 16 is integrally formed with a lower end of the neck 15. The wiping portion 16 extends parallel to the retained portion 12 and is used to wipe the outer surface of the windshield (surface to be wiped). The width of the wiping portion 16 decreases from the end closer to the neck 15 toward the lower end. The width of the wiping portion 16 at the distal end is substantially equal to that of the neck 15. The cross-sectional shape of the wiper strip 11 is constant along its length.

The backing 21 is made by an elongated belt-like metal plate. The backing 21 also has a leaf spring-like shape and imparts rigidity and resilience to the wiper strip 11. The rigidity is transverse rigidity in a direction parallel to the surface to be wiped. The resilience is vertical resilience in a direction perpendicular to the surface to be wiped. The backing 21 is located above and contacts the retained portion 12 on the side opposite to the wiping portion 16. The width of the backing 21 is greater than the width of the retained portion 12, so that the ends of the backing 21 in the width direction protrude beyond those of the retained portion 12. A pair of engagement recesses 22 is formed at either end in the longitudinal direction of the backing 21. The engagement recesses 22 in each pair are dented toward the center from both sides of the backing 21 in the width direction. Each engagement recess 22 extends through the backing 21 in the thickness direction and has a rectangular shape as viewed in the thickness direction.

Each case 31 includes a retaining portion 32 and a fin 33. The retaining portion 32 encompasses and retains the retained portion 12 of the wiper strip 11 and the backing 21. The fin 33 converts force applied to the wiper blade 3 by relative wind caused by traveling of the vehicle to pressing force acting toward the outer surface of the windshield (surface to be wiped).

The retaining portion 32 is made of a soft (flexible) plastic material and substantially has a tubular shape extending in the longitudinal direction of the wiper strip 11. The length of the retaining portion 32 of each case 31 is slightly less than half the length of the backing 21. The retaining portion 32 of each case 31 has in it a backing accommodating portion 32a, which is formed like a groove extending in the longitudinal direction of the case 31. The backing accommodating portion 32a extends in the longitudinal direction of the retaining portion 32 from a first end to a second end and opens to at the ends in the longitudinal direction of the retaining portion 32. The width and the depth of the backing accommodating portion 32a are substantially equal to the width and the thickness of the backing 21, respectively. The cross-sectional shape of the backing accommodating portion 32a is constant along the length of the retaining portion 32.

In each retaining portion 32, a rubber accommodating portion 32b is formed at a position below the backing accommodating portion 32a (on a side closer to the surface to be wiped). The rubber accommodating portion 32b is formed as a groove that extends in the longitudinal direction of the retaining portion 32. The rubber accommodating portion 32b extends from the first end to the second end along the length of each retaining portion 32 and opens to at the ends in the longitudinal direction of the retaining portion 32. The width of the rubber accommodating portion 32b is less than that of the backing accommodating portion 32a. The depth of the rubber accommodating portion 32b is substantially equal to the thickness of the retained portion 12. The cross-sectional shape of the rubber accommodating portion 32b is constant along its length. The upper end of the rubber accommodating portion 32b opens to the backing accommodating portion 32a, so that the interior space of the rubber accommodating portion 32b is connected to the interior space of the backing accommodating portion 32a.

Each retaining portion 32 has an insertion slit 32c at a position below the rubber accommodating portion 32b (on a side closer to the surface to be wiped). The insertion slit 32c is formed at a center in the width direction of the rubber accommodating portion 32b, and extends in the longitudinal direction of the case 31 from a first end to a second end of the case 31. That is, the insertion slit 32c extends along the entire length of the case 31. The insertion slit 32c opens to the interior space of the rubber accommodating portion 32b and to the outside of the retaining portion 32 to connect these. The width of the insertion slit 32c is substantially equal to the width of the constriction 13, and the depth of the insertion slit 32c is substantially equal to the thickness of the constriction 13 (the vertical length as viewed in FIG. 3).

Each of the fins 33 shown in FIGS. 1 and 3 is made of elastomer and integrally molded on the corresponding retaining portion 32 by two-color molding. As described above, the retaining portion 32 is made of a soft plastic, and has a higher rigidity than the fin 33. That is, the fins 33 are formed of a material that has a different rigidity from the other parts of the cases 31. Each fin 33 is formed to have a curved surface. When the wiper blade 3 is at a stop position, the height of the fin 33 from the surface to be wiped increases toward the rear end of the vehicle.

As shown in FIGS. 2 and 3, the backing 21 is inserted into the backing accommodating portions 32a in the longitudinal direction from the first end in the longitudinal direction of the cases 31. Accordingly, the backing 21 is retained in the retaining portions 32 of the cases 31. The ends in the longitudinal direction of the backing 21, which is retained in the retaining portions 32, each extend outward from the longitudinal end of the retaining portion 32, so that the engagement recesses 22 are located outside the retaining portion 32. In each case 31, the outer end in the longitudinal direction of the backing 21 is defined as a first end 31a, and the inner end in the longitudinal direction of the backing 21 is defined as a second end 31b.

The retained portion 12 is inserted into the rubber accommodating portions 32b in the longitudinal direction, while the constriction 13 is inserted into the insertion slit 32c in the longitudinal direction. Accordingly, the retained portion 12 is retained in the retaining portions 32 of the cases 31. When the retained portion 12 is inserted into the rubber accommodating portions 32b, the wiper strip 11 is retained by the retaining portions 32. The retained portion 12, which is located in the rubber accommodating portions 32b, is located closer to the surface to be wiped relative to the backing 21. The backing 21 contacts (is placed on) the upper surface of the retained portion 12. The shoulder portion 14, the neck 15, and the wiping portion 16 are located outside and below (closer to the surface to be wiped) the retaining portion 32. The shoulder portion 14 contacts the lower surfaces (surfaces closer to the surface to be wiped) of the retaining portions 32. The ends in the longitudinal direction of the retained portion 12 and the constriction 13 extend outward from the longitudinal ends of the retaining portions 32 (from the first ends 31a of the cases 31).

Figure 4:
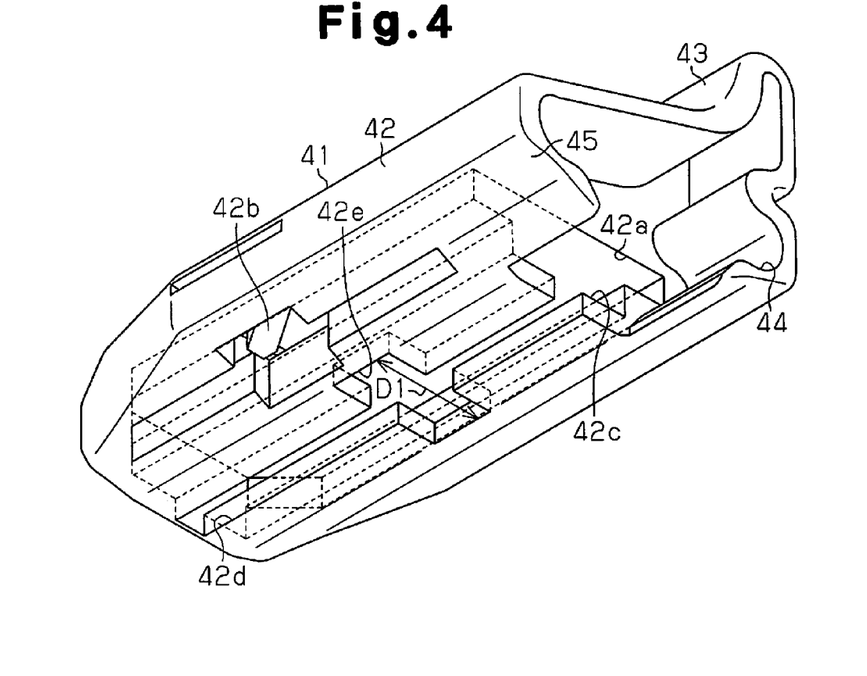
FIG. 4 is a perspective view of a cap of FIG. 1.

The caps 41, which are attached to both ends in the longitudinal direction of the backing 21 as shown in FIGS. 2 and 4, are made of plastic. Each cap 41 includes a substantially tubular continuous retaining portion 42, which is slightly larger than the retaining portion 32 of each case 31, and a continuous fin 43, which is formed integrally with an upper part of the continuous retaining portion 42. Each cap 41 has an attachment recess 44 at an end facing the corresponding case 31. The attachment recess 44 receives the first end 31a of the corresponding case 31. The attachment recess 44 is dented in the longitudinal direction of the wiper blade 3 and formed across the boundary between the continuous retaining portion 42 and the continuous fin 43. That is, the caps 41 each have a fin accommodating portion for accommodating an end of the continuous fin 43. The side wall of the attachment recess 44 forms a lap portion 45, which extends toward the case 31 to cover the surface (outer surface) of the first end 31a of the case 31. The shape of the inner surface of the lap portion 45 corresponds to the surface (outer surface) of the first end 31a. The lap portion 45 is thinner than a part of the cap 41 that is on the opposite side with respect to the case 31, for example, the continuous retaining portion 42.

The continuous retaining portions 42 are each formed to be tubular and extend in the direction in which the attachment recesses 44 are dented. An end of each continuous retaining portion 42 that is opposite to the attachment recess 44 is closed. The continuous retaining portion 42 has an in-cap backing accommodating portion 42a, which is formed as a groove like the backing accommodating portion 32a formed in the retaining portion 32. The width and the depth of the in-cap backing accommodating portion 42a are substantially equal to the width and the thickness of the backing 21, respectively. The cross-sectional shape of each in-cap backing accommodating portion 42a is constant along its length. A longitudinal end of the in-cap backing accommodating portion 42a that is closer to the attachment recess 44 opens in the bottom of the attachment recess 44. On an inner side surface in the width direction of the in-cap backing accommodating portion 42a (the side surface closer to the viewer of FIG. 4), an engagement protrusion 42b (attachment element) is formed to protrude into the in-cap backing accommodating portion 42a. The engagement protrusion 42b is inclined away from the attachment recess 44 from the proximal end to the distal end. The engagement protrusion 42b is elastically deformable.

An in-cap rubber accommodating portion 42c, which is shaped as a groove like the rubber accommodating portion 32b formed in the retaining portion 32, is formed in the continuous retaining portion 42 at a position below the in-cap backing accommodating portion 42a (a part facing the surface to be wiped). The in-cap rubber accommodating portion 42c extends parallel with the rubber accommodating portion 32b. Like the in-cap backing accommodating portion 42a, a longitudinal end of the in-cap rubber accommodating portion 42c that is closer to the attachment recess 44 opens in the bottom of the attachment recess 44. The width of the in-cap rubber accommodating portion 42c is less than that of the in-cap backing accommodating portion 42a and is substantially equal to that of the retained portion 12. The depth of the in-cap rubber accommodating portion 42c is substantially equal to the thickness of the retained portion 12. The cross-sectional shape of each in-cap rubber accommodating portion 42c is constant along its length. The upper end of the in-cap rubber accommodating portion 42c opens to the interior space of the in-cap backing accommodating portion 42a, and the interior space of the in-cap rubber accommodating portion 42c is connected to the interior space of the in-cap backing accommodating portion 42a.

An in-cap insertion slit 42d, which has a shape similar to the insertion slit 32c formed in the retaining portion 32, is formed in the continuous retaining portion 42 at a position below the in-cap rubber accommodating portion 42c (a part facing the surface to be wiped). The in-cap insertion slit 42d is formed at a position adjacent to a widthwise center of the in-cap rubber accommodating portion 42c. The in-cap insertion slit 42d extends parallel with the in-cap rubber accommodating portion 42c. Like the in-cap backing accommodating portion 42a, a longitudinal end of the in-cap insertion slit 42d that is closer to the attachment recess 44 opens in the bottom of the attachment recess 44. The in-cap insertion slit 42d opens to the interior space of the in-cap rubber accommodating portion 42c and the outside of the continuous retaining portion 42.

Each continuous retaining portion 42 has a rubber insertion hole 42e at a position below the in-cap rubber accommodating portion 42c (on a side closer to the surface to be wiped). The rubber insertion hole 42e is formed substantially at a longitudinal center of the in-cap insertion slit 42d. The width of the rubber insertion hole 42e is greater than that of the in-cap insertion slit 42d. The rubber insertion hole 42e extends vertically through a part of the continuous retaining portion 42 that is below the in-cap rubber accommodating portion 42c. Therefore, the rubber insertion hole 42e faces the surface to be wiped and opens to the outside of the cap 41, thereby connecting the outside of the cap 41 and the interior of the cap 41 (that is, the in-cap rubber accommodating portion 42c of the continuous retaining portion 42). The width D1 of the rubber insertion hole 42e is substantially equal to the width D2 of the retained portion 12 (see FIG. 3), so that the constriction 13 can be inserted into the in-cap insertion slit 42d and the retained portion 12 can enter the cap 41 via the rubber insertion hole 42e.

Figure 5:
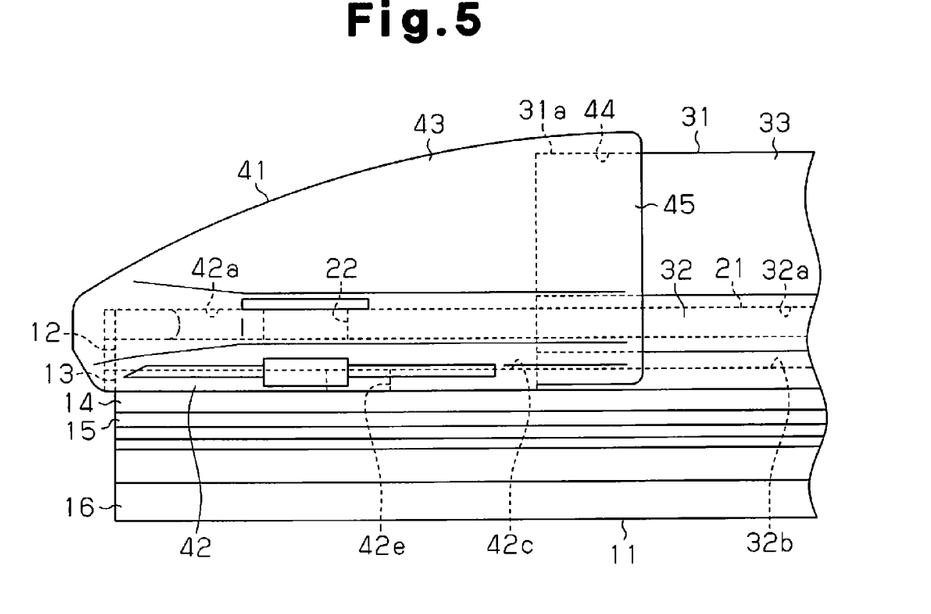
FIG. 5 is a side view of the wiper blade shown in FIG. 1.

As shown in FIGS. 1 and 5, like the fins 33, each continuous fin 43 is formed to have a curved surface. When the wiper blade 3 is at a stop position, the height of the continuous fin 43 from the surface to be wiped increases toward the rear end of the vehicle. An end of each continuous fin 43 opposite to the attachment recess 44 is formed to have a height that gradually decreases as the distance from the attachment recess 44 increases. Each continuous fin 43 has a solid structure without a hollow except for the part in which the attachment recess 44 is formed.

As shown in FIGS. 4 and 5, in each cap 41, the longitudinal end of the backing 21 is retained by the retaining portion 32 of the case 31, and the longitudinal end is inserted into the in-cap backing accommodating portion 42a via the attachment recess 44. The engagement protrusion 42b is engaged with the engagement recesses 22 through a snap-fit structure, which fixes (attaches) the cap 41 to the backing 21. That is, each cap 41 is installed by being elastically engaged with the backing 21 via the engagement protrusion 42b. The attachment recess 44 of each cap 41, which is fixed to a longitudinal end of the backing 21, receives the first end 31a of the corresponding case 31, and the corresponding lap portion 45 is laid on the first end 31a. The caps 41, which are fixed to the backing 21, restrict the relative movement in the longitudinal direction between the backing 21 and the cases 31. This prevents the longitudinal end of each case 31 (the first end 31a) from falling off the backing 21, in other words, prevents each case 31 from falling off the backing 21.

In each cap 41, which is fixed to the backing 21, the continuous retaining portion 42 is adjacent to the retaining portion 32 of the case 31 in the longitudinal direction, and the continuous fin 43 is adjacent to the fin 33 of the case 31 in the longitudinal direction. The continuous retaining portion 42 extends the retaining portion 32 in the longitudinal direction, and the continuous fin 43 extends the fins 33 in the longitudinal direction. In a transition part from the outer surface of each cap 41 to the outer surface of the corresponding case 31, only a small step, which corresponds to the thickness of the lap portion 45, exits between the outer surface of the cap 41 and the outer surface of the case 31.

Each in-cap backing accommodating portion 42a is adjacent to the backing accommodating portion 32a of the corresponding case 31 in the longitudinal direction of the backing 21, and is connected to the interior space of the backing accommodating portion 32a. Likewise, each in-cap rubber accommodating portion 42c is adjacent to the rubber accommodating portion 32b of the corresponding case 31 in the longitudinal direction of the backing 21, and is connected to the interior space of the rubber accommodating portion 32b. Therefore, the rubber insertion hole 42e connects the outside of the cap 41 and the interior of the cap 41 (that is, the in-cap backing accommodating portion 42a and the in-cap rubber accommodating portion 42c) to each other, and connects the outside of the cap 41 and the interior of the case 31 (that is, the backing accommodating portion 32a and the rubber accommodating portion 32b) to each other. The in-cap insertion slit 42d is adjacent to the insertion slit 32c of the case 31 in the longitudinal direction of the backing 21, and is connected to the insertion slit 32c to extend the insertion slit 32c.

The retained portion 12 and the constriction 13 of the wiper strip 11 extend outward from the longitudinal ends of the retaining portions 32 (from the first ends 31a of the cases 31). The retained portion 12 is inserted into each in-cap rubber accommodating portions 42c, and the constriction 13 is inserted into each in-cap insertion slits 42d. The caps 41, which are fixed to the backing 21, restrict the wiper strip 11 from moving relative to the backing 21 and the cases 31 in the longitudinal direction, thereby preventing the wiper strip 11 from coming off the cases 31 from the longitudinal ends (the first ends 31a).

As shown in FIG. 1, the wiper blade 3 includes a coupling device 51 for coupling the wiper blade 3 to the wiper arm 2. The coupling device 51 is fixed to a center portion of the backing 21 in the longitudinal direction, and the distal end of the wiper arm 2 is coupled to the coupling device 51. The coupling device 51 rotationally couples the wiper blade 3 to the wiper arm 2. The coupling device 51 has an unillustrated in-coupling device rubber accommodating portion, which extends along the length to connect the rubber accommodating portions 32b at the second ends 31b of the cases 31 to each other.

In the above described vehicle wiper 1, the distal end of the wiper arm 2 is urged toward the windshield (surface to be wiped) by an unillustrated urging mechanism. The urging force is transmitted to the wiper strip 11 via the coupling device 51 and the backing 21, so that the wiping portion 16 of the wiper strip 11 is pressed against the outer surface of the windshield (the surface to be wiped) over the entire length. When the vehicle is traveling, relative wind is generated. The relative wind applies force to the wiper blade 3, and the fin 33 converts the force into pressing force against the windshield (the surface to be wiped). The pressing force presses the wiping portion 16 against the outer surface of the windshield (the surface to be wiped) As describe above, when the wiper arm 2 is swung to-and-fro about the pivot axis, the wiper blade 3 performs a favorable wiping operation.

Operation of the wiper blade 3 of the present embodiment will now be described with reference to FIGS. 2, 4 and 6A to 6C.

Figures 6A, 6B:
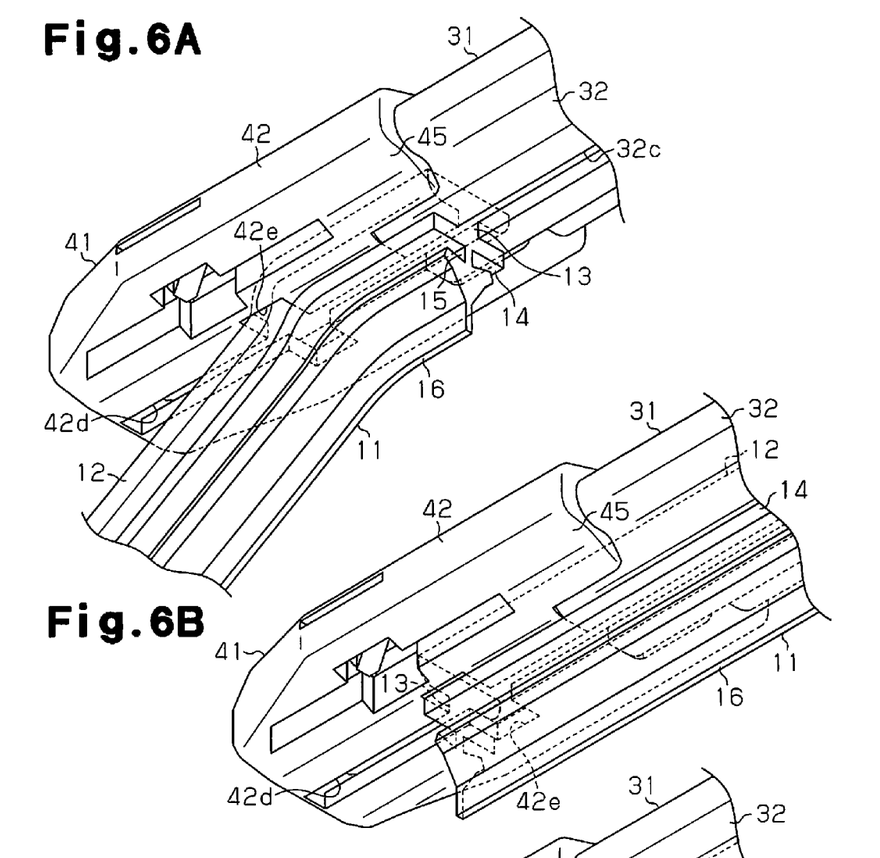
FIGS. 6A to 6C are perspective views illustrating a manner in which the wiper blade of FIG. 1 is attached and removed.
Figure 6C:
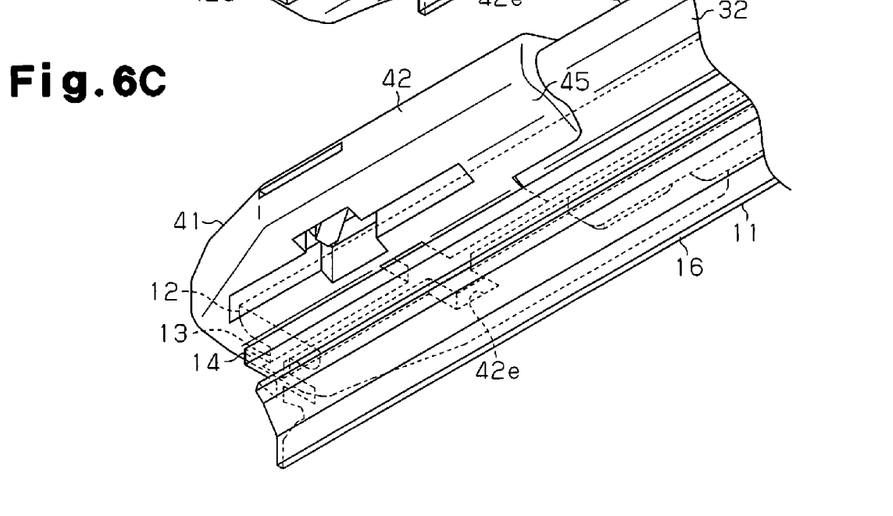

As shown in FIG. 6A, the backing 21 (not illustrated in FIGS. 6A to 6C) is accommodated in the cases 31, the caps 41 are attached to the ends in the longitudinal direction of the backing 21. The wiper strip 11 is attached to the cases 31 in the following manner. First, the first end in the longitudinal direction of the retained portion 12 is inserted into the in-cap rubber accommodating portion 42c through the rubber insertion hole 42e of the first cap 41. Simultaneously, the first end in the longitudinal direction of the constriction 13 is inserted into the in-cap insertion slit 42d from the rubber insertion hole 42e. While the constriction 13 is being inserted into the in-cap insertion slit 42d toward the case 31, the retained portion 12 is inserted into the in-cap rubber accommodating portion 42c toward the case 31. Further, the wiper strip 11 is moved in the longitudinal direction of the backing 21. Accordingly, while the constriction 13 is being inserted into the insertion slit 32c, which is continuous to the in-cap insertion slit 42d, the retained portion 12 is inserted into the rubber accommodating portion 32b, which is continuous to the in-cap rubber accommodating portion 42c. The wiper strip 11 is moved in the longitudinal direction of the backing 21 until the first end of the retained portion 12 and the first end of the constriction 13 pass through both cases 31 and reach the in-cap rubber accommodating portion 42c and the in-cap insertion slit 42d of the second cap 41. Thereafter, as shown in FIG. 6B, while compressing the wiper strip 11 in the longitudinal direction toward the second cap 41, the second end of the retained portion 12 in the longitudinal direction is inserted into the in-cap rubber accommodating portion 42c of the first cap 41 from the rubber insertion hole 42e. At the same time, the second end of the constriction 13 in the longitudinal direction is inserted into the in-cap insertion slit 42d of the first cap 41 from the rubber insertion hole 42e. Subsequently, as shown in FIG. 6C, when the compression of the wiper strip 11 in the longitudinal direction is cancelled so that the wiper strip 11 returns to its original form, the second end of the retained portion 12 and the second end of the constriction 13 are moved toward the bottom of the cap 41 relative to the rubber insertion hole 42e in the first cap 41 (in a direction opposite to the attachment recess 44). In this manner, the wiper strip 11 is attached to the cases 31 without removing the caps 41 from the backing 21.

When removing the wiper strip 11 from the cases 31, the wiper strip 11 is compressed until the first end in the longitudinal direction of the wiper strip 11 reaches the rubber insertion hole 42e of the cap 41 that retains the first end. Thereafter, the retained portion 12 and the constriction 13 are pulled out of the cap 41 through the rubber insertion hole 42e. In this manner, the wiper strip 11 is removed from the cases 31 without removing the caps 41 from the backing 21.

As described above, the present embodiment has the following advantages.

(1) With the caps 41 remaining attached to the longitudinal ends of the backing 21, the retained portion 12 can be inserted into the cases 31 through the rubber insertion hole 42e of one of the caps 41. Also, the retained portion 12, which is retained in the cases 31, can be removed from the rubber insertion hole 42e. Therefore, without removing the caps 41 from the ends of the backing 21, the wiper strip 11 can be attached to and removed from the cases 31. Accordingly, the caps 41 are prevented from being lost when the wiper strip 11 is attached to and removed from the cases 31.

(2) The surface of one of the longitudinal ends of each case 31 that is adjacent to the corresponding cap 41 (that is, the first end 31a) is covered with the lap portion 45. Thus, it is possible to prevent foreign matter such as snow and dead leaves from entering the case 31 through the first end 31a (specifically, the opening of the backing accommodating portion 32a and the rubber accommodating portion 32b that are closer to the first end 31a). Also, the lap portion 45 is thinner than a part of the cap 41 that is on the opposite side with respect to the case 31. Therefore, the first end 31a of each case 31 can be inserted into the corresponding cap 41 without enlarging the outer shape of the lap portion 45 compared to parts of the cap 41 other than the lap portion 45. Thus, the appearance of the wiper blade 3, which includes the caps 41, is improved. Further, by increasing the thickness of each cap 41 except for the lap portion 45, the strength of the cap 41 can be increased.

(3) Since the caps 41 are attached the longitudinal ends of the backing 21, the caps 41 are located at ends of the wiper blade 3. Therefore, when the retained portion 12 is inserted into the retaining portion 32 via the rubber insertion hole 42e from the first end in the longitudinal direction, the amount of compression of the wiper strip 11 required for inserting the second end in the longitudinal direction of the retained portion 12 into the caps 41 is smaller than that in a case in which a rubber insertion hole is formed in each case 31. Likewise, when an end of the retained portion 12 is pulled out from one of the caps 41 through the rubber insertion hole 42e to remove the wiper strip 11 from the cases 31, the amount of compression in the longitudinal direction of the wiper strip 11 is small. Accordingly, the cases 31 can be easily attached to and removed from the wiper strip 11.

(4) The rubber insertion holes 42e open to the surface to be wiped, and the retained portion 12 is located closer to the surface to be wiped than the backing 21 in the retaining portion 32. Therefore, the retained portion 12 can be inserted into the cases 31 via the rubber insertion holes 42e without protruding beyond the backing 21. Likewise, the retained portion 12 can be removed from the cases 31 via the rubber insertion holes 42e without protruding beyond the backing 21. Accordingly, the cases 31 can be easily attached to and removed from the wiper strip 11, which uses the rubber insertion holes 42e.

The embodiment of the present invention may be modified as follows.

Figure 7A:
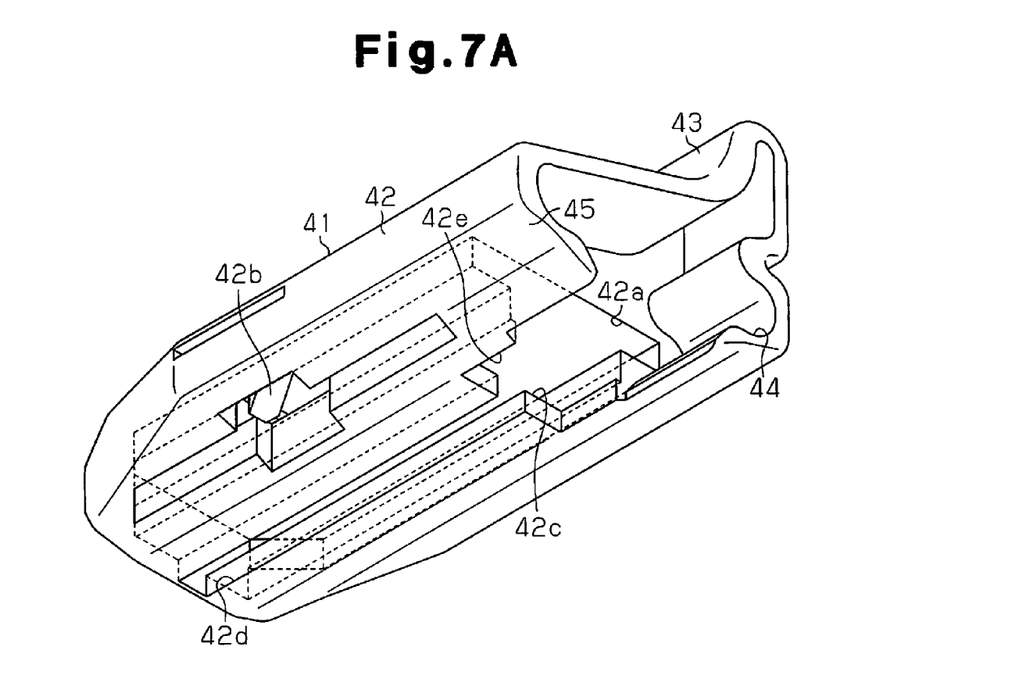
FIG. 7A is a perspective view of a cap according to another embodiment.
Figure 7B:
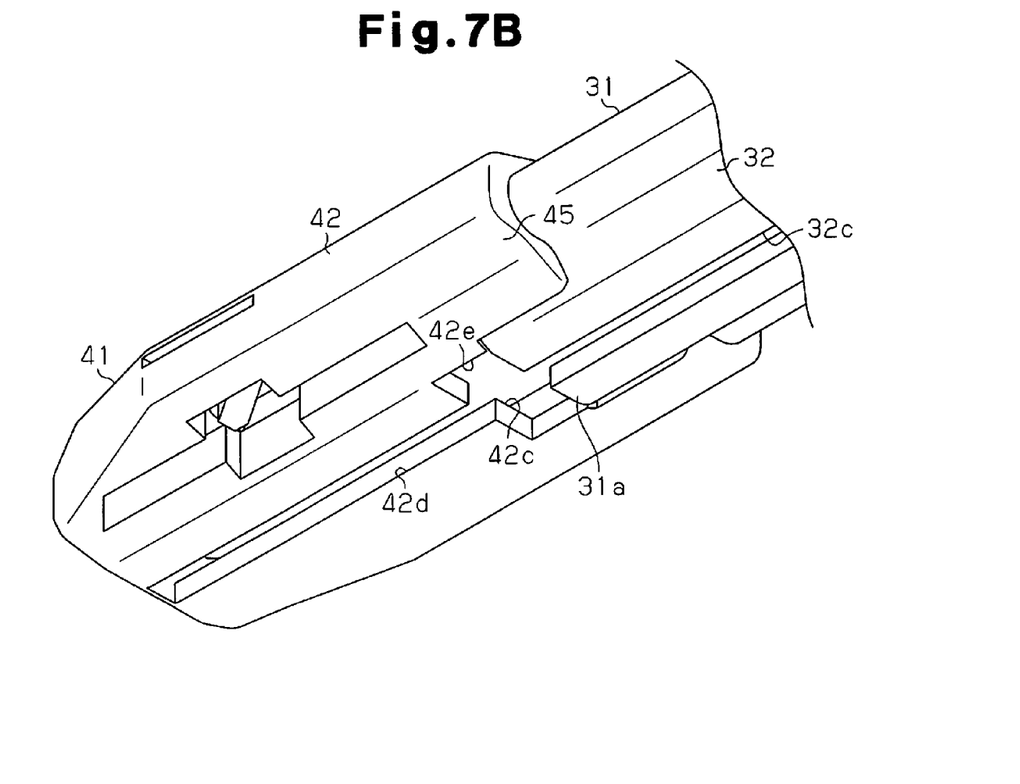
FIG. 7B is a perspective view of the cap and the case of FIG. 7A.

In the above illustrated embodiment, the rubber insertion hole 42e is located below the in-cap rubber accommodating portion 42c (a side facing the surface to be wiped) in each cap 41 and substantially at a center in the longitudinal direction of the in-cap insertion slit 42d. However, the position of the rubber insertion hole 42e is not limited to this position. As shown in FIG. 7A, the rubber insertion hole 42e may be located below the in-cap rubber accommodating portion 42c (a side facing the surface to be wiped) and adjacent to the attachment recess 44. The rubber insertion hole 42e has an opening on the bottom surface of the attachment recess 44. As shown in FIG. 7B, when the first end 31a of the case 31 is inserted into the attachment recess 44, the rubber insertion hole 42e is adjacent to the first end 31a, and the opening of the rubber insertion hole 42e is closed by the first end 31a. That is, the rubber insertion hole 42e opens to the first end 31a of the case 31. That is, the rubber insertion hole 42e is formed in the vicinity of the first end 31a of the case 31. These alternative structures achieve the same advantages as the above items (1) to (4) of the above embodiment. The caps 41 can be reduced in size in the longitudinal direction of the wiper blade 3. The shape of the mold for molding the caps 41 can be simplified compared to the above illustrated embodiment, in which the rubber insertion holes 42e are formed at positions away from the first ends 31a of the cases 31 in the caps 41.

In the above illustrated embodiment, the rubber insertion holes 42e open toward the surface to be wiped. However, the rubber insertion holes 42e do not need to face the surface to be wiped as long as they open to the outside of the caps 41 and communicate with the rubber accommodating portions 32b, so that the retained portion 12 can enter the caps 41 via one of the rubber insertion holes 42e. For example, the rubber insertion holes 42e may be formed to open to one side of the continuous retaining portions 42 in the width direction.

In the above illustrated embodiment, the lap portion 45 is thinner than a part of the cap 41 that is on the opposite side with respect to the case 31. However, the lap portions 45 may have the same thickness as, for example, the continuous retaining portions 42. Also, the caps 41 do not need to have the lap portion 45.

In the above illustrated embodiment, the backing accommodating portion 32a is connected to the rubber accommodating portion 32b. However, a partition for separating the backing accommodating portion 32a and the rubber accommodating portion 32b may be formed, so that the partition is located between the backing 21 and the retained portion 12. In this case, a partition may be formed in the cap 41 to separate the in-cap backing accommodating portion 42a and the in-cap rubber accommodating portion 42c. However, the rubber insertion hole 42e is connected to the in-cap rubber accommodating portion 42c, and the in-cap rubber accommodating portion 42c is connected to the rubber accommodating portion 32b.

In the above illustrated embodiment, the cap 41 is fixed to the backing 21 through snap-fit of the engagement protrusion 42b with the engagement recess 22. However, since the caps 41 do not need to be removed when replacing the wiper strip 11, the caps 41 may be fixed to the backing 21 through adhesion or welding.

In the above illustrated embodiment, the caps 41 are attached (fixed) to the both ends in the longitudinal direction of the backing 21. However, the caps 41 may be attached (fixed) to the first ends 31a of the cases 31. In this case, also, with the caps 41 remaining attached to the longitudinal ends of the cases 31, the retained portion 12 can be inserted into the cases 31 through the rubber insertion holes 42e of the caps 41. This modification achieves the same advantage as the above item (1) of the above illustrated embodiment.

In the above illustrated embodiment, the wiper blade 3 has a pair of cases 31. However, the wiper blade 3 may have a single case 31 the length of which is substantially equal to that of the backing 21 (or of the wiper strip 11).

The cases 31 do not necessarily need to have the fins 33.

In the above illustrated embodiment, the coupling device 51 is fixed to the backing 21. However, the coupling device 51 may be fixed to the cases 31. Also, the coupling device 51 may be provided at the distal end of the wiper arm 2, not at the distal end of the wiper blade 3.

In the above illustrated embodiment, the number of backing 21 is one. However, two backings may be used. Further, instead of plate-like or band-like shape, the backing 21 may have a rod-like shape.

What is claimed is:

1. A wiper blade comprising:
   an elongated wiper strip having an elongated retained portion and a wiping portion, which extends parallel with the retained portion, is adapted for wiping a surface to be wiped;
   a backing, which is provided along a length of the wiper strip and imparts rigidity and resilience to the wiper strip;
   a case, which is provided along the length of the wiper strip and retains therein the retained portion and the backing; and
   a cap, which is attached to at least one end in a longitudinal direction of the backing or to at least one end in a longitudinal direction of the case, the cap accommodating the retained portion at a corresponding end of the wiper strip in an interior space of the cap, wherein
   the case has an insertion slit that opens to an outside of the case, communicates with an interior space of the case, and extends along the length of the case,
   a width of the insertion slit being smaller than a width of the retained portion,
   with the cap attached to the backing or to the case, which retains therein the backing, the interior space of the cap communicates with the interior space of the case,
   the cap has a rubber insertion hole that opens to the outside of the cap, and the retained portion can enter the interior space of the cap via the rubber insertion hole, and
   with the cap attached to the backing or to the case, the rubber insertion hole is continuous to the insertion slit, the retained portion can enter the interior space of the case and the interior space of the cap, and
   with the retained portion inserted into the interior space of the case, the wiping portion is located outside the case.

2. The wiper blade according to claim 1, wherein the rubber insertion hole is adjacent to the at least one end in the longitudinal direction of the case, and opens toward the end in the longitudinal direction of the case.

3. The wiper blade according to claim 1, wherein the cap has an in-cap insertion slit that is located at least on an opposite side of the rubber insertion hole to the case and communicates with the rubber insertion hole, and the retained portion can enter, via the in-cap insertion slit, a part of the interior space of the cap that is located outside of the rubber insertion hole with respect to the longitudinal direction of the wiper strip.

4. The wiper blade according to claim 1, wherein the rubber insertion hole is located on a side of the cap that faces the surface to be wiped, and opens toward the surface to be wiped, and the retained portion is located on a side of the backing that faces the surface to be wiped.

5. The wiper blade according to claim 1, wherein an end in the longitudinal direction of the case that is adjacent to the cap is inserted into the cap, the cap includes a lap portion that extends toward the case to cover the surface of the end of the case that is inserted into the cap, and the lap portion is thinner than a part of the cap that is on an opposite side with respect to the case.

6. The wiper blade according to claim 1, wherein the cap includes an attachment element, which is elastically engaged with and attached to the backing or the case.

7. The wiper blade according to claim 1, wherein the case includes a fin, which is located on a side opposite to a side on which the wiper strip is located and receives relative wind of the vehicle to generate pressing force pressing the wiper strip against the surface to be wiped, and the cap includes a fin accommodating portion that accommodates an end of the fin when the cap is attached to the backing or to the case.

8. The wiper blade according to claim 1, wherein the wiper strip further includes a constriction which extends parallel with the retained portion and the wiping portion and is integrally formed with the retained portion and the wiping portion, the width of the insertion slit is substantially equal to the width of the constriction, with the retained portion inserted into the interior of the case, the constriction is located in the insertion slit.

9. The wiper blade according to claim 1, wherein the cap is a first cap that is attached to a first end of the at least one end in the longitudinal direction of the backing or to a first end of the at least one end in the longitudinal direction of the case, the wiper blade further comprises a second cap that is attached to a second end of the at least one end in the longitudinal direction of the backing or to a second end of the at least one end in the longitudinal direction of the case, and with the first and second caps attached to the backings or to the cases, and with the wiper strip being retained in the cases, the wiper strip can move in the longitudinal direction between the first and second caps.

10. The wiper blade according to claim 1, wherein the cross-sectional shape of the wiper strip is constant along the length.

* * * * *